March 16, 1965 R. P. LIPKIS ETAL 3,173,801
ELECTROMAGNETIC RADIATION ENERGY ARRANGEMENT
Filed May 26, 1961

EXHAUST

ROBERT P. LIPKIS
JOHN E. VEHRENCAMP
INVENTORS

BY Don Finkelstein
AGENT
Albert Rosen
ATTORNEY 3,173,801
ELECTROMAGNETIC RADIATION ENERGY
ARRANGEMENT
Robert P. Lipkis, Los Angeles, and John E. Vehrencamp, Hermosa Beach, Calif., assignors, by mesne assignments, to Thompson Ramo Wooldridge Inc., Cleveland, Ohio, a corporation of Ohio
Filed May 26, 1961, Ser. No. 112,999
10 Claims. (Cl. 117—35)

This invention relates to thermal surfaces and, more particularly, to an improved thermal surface exhibiting a high absorptivity for solar electromagnetic radiation energy and a low emissivity for infrared electromagnetic radiation energy. As used herein, infrared electromagnetic radiation energy refers to the energy in that region of the electromagnetic radiation spectrum between approximately 6 to 40 microns.

In many applications of thermal surfaces, as for example solar energy collectors utilized in solar boilers as power sources in desert regions, it is desirable that the solar energy collectors absorb as much solar electromagnetic radiation energy as possible while at the same time losing as little thermal energy as possible. Of the three modes of losing thermal energy: convective, conductive, and radiative, heat losses by convection and conduction can be controlled to a large extent by well-known techniques. However, losses by radiation have not always proven susceptible, in the past, to a satisfactory degree of control.

At the desired operating temperatures of such solar energy collectors, thermal energy losses by radiation occur predominently in the infrared portion of the electromagnetic spectra. Therefore, it is necessary that such solar energy collectors be strongly absorbent of electromagnetic radiation energy in the solar spectrum and at the same time have a low emissivity for electromagnetic radiation in the infrared portion of the electromagnetic spectrum.

The ratio of solar electromagnetic radiation energy absorptivity $a$ to infrared electromagnetic radiation energy emissivity $e$ has been utilized in the past as a parameter for evaluating solar energy collector performance. For example, Tabor in the "Bulletin of the Research Counsel of Israel," vol. 5A, 1955, page 119, reports a solar energy collector material having a ratio between 8 and 9; Ungar in "The Preparation of a Selectively Black Surface for Use in the Collection of Solar Energy," Doctor of Science Thesis, Massachusetts Institute of Technology, June 1958, has reported a value between 9 and 10; and in the "Journal of the Optical Society of America," February 1957, page 125, Hass and Bradford have reported achieving a ratio between about 5 to 6 with freshly vacuum deposited titanium and, further, that by heating the titanium to 400° C. for three hours this ratio increased slightly. In many applications of thermal energy collectors, these values have proven insufficient to provide the degree of thermal radiation loss desired.

Accordingly, it is an object of applicants' invention to provide an improved thermal surface.

It is another object of applicants' invention to provide a solar energy collector having an increased ratio of solar electromagnetic radiation absorptivity to infrared electromagnetic radiation emissivity.

It is still a further object of applicants' invention to provide a solar energy collector material in which the ratio of solar electromagnetic radiation absorptivity to infrared electromagnetic radiation energy emissivity is on the order of 25 to 100.

The above and other objects are achieved, according to applicants' invention, in a solar energy collector that exhibits a ratio of solar electromagnetic radiation energy absorptivity to infrared electromagnetic radiation emissivity on the order of values between 25 and 100.

In one embodiment of applicants' invention, a sheet of Mylar film is first coated, on one side, with a vacuum deposited layer of aluminum. The thickness of the deposited aluminum layer is sufficient to be subtantially opaque to electromagnetic radiation in the visible portion of the electromagnetic radiation spectrum and this thickness may be on the order of 200 to 400 Angstroms. The aluminum is then coated with a vacuum deposited layer of titanium to a thickness of 800 to 1000 Angstroms. The vacuum deposition of the titanium is accomplished in a comparatively poor vacuum, for example on the order of $10^{-4}$ millimeters of mercury absolute, at a deposition rate of approximately 80 Angstroms per second. A titanium boat, containing a source of raw titanium for the deposition, was maintained in the vacuum chamber at a distance of approximately 18 inches from the aluminum coated Mylar film.

Measurement of the spectral properties of a solar energy collector obtained by the above described method indicated a solar electromagnetic radiation energy absorptivity of between .82 to .85 while the infrared electromagnetic radiation energy emissivity was less than .03, providing a ratio on the order of twenty-seven to twenty-eight.

In another embodiment of applicant's invention, an infrared mirror having a low visible energy reflectance is prepared. In this embodiment a suitable substrate, such as a sheet of lapped and polished aluminum, is coated on one side by a vacuum deposited layer of aluminum. The aluminum coating is then covered with a titanium coating substantially by the method described above for the solar energy collector. Such a mirror is characterized by a low reflectance of electromagnetic radiation energy in the visible portion of the electromagnetic radiation spectrum and a low emissivity of infrared electromagnetic radiation energy (which minimizes spurious signals), while also exhibiting a high reflectivity for infrared electromagnetic energy.

This invention is more fully explained in the following detailed description and with reference to the accompanying drawing wherein similar reference characters refer to similar elements and in which.

Figure 1:
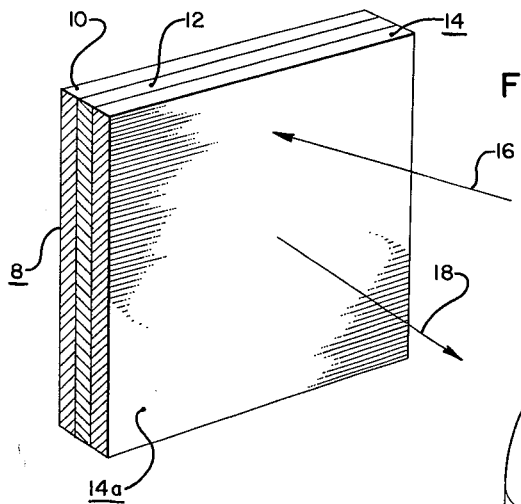
FIGURE 1 shows a solar energy collector in accordance with applicants' invention.

Referring now to FIGURE 1, there is shown a section of a solar energy collector, generally designated 8, in accordance with applicants' invention. A substrate material 10, which may be for example Mylar, thin film polyethylene or the like, has a vacuum deposited aluminum coating 12 bonded to one surface thereof. The surface of the substrate 10 upon which the aluminum coating 12 is deposited should be comparatively smooth to provide optimum radiative characteristics. A layer of titanium 14 is vacuum deposited upon the layer of aluminum 12. Applicants have found that the titanium layer 14 provides the desired radiative characteristics for thicknesses up to 1000 Angstroms and, in the preferred embodiment of applicants' invention, the layer of titanium 14 has a thickness of between 800 and 1000 Angstroms.

When solar radiation, designated schematically in FIGURE 1 by arrow 16, impinges upon the deposited titanium layer 14, there is substantial absorption of the solar radiation energy. The integrated absorptivity for solar radiation by the above described solar energy collector matetil has been found to be not less than .82 and ranging to .85 and higher values.

The solar energy thus absorbed by the solar energy collector 8 may be utilized, for example, in solar boiler applications to heat water (not shown). In such an arrangement, the water to be heated is circulated adjacent the substrate 10 thereby removing heat from the solar energy collector 8. Since it is desired to transfer as much heat as possible from the solar energy collector 8 to the water, other modes of heat dissipation from the solar energy collector 8 must be minimized. As discussed above, the convective and conductive heat losses may be minimized by well-known techniques. The radiative heat losses are uniquely controlled by applicants' invention herein. This is achieved in the above described configuration by depositing the titanium layer 14 to a thickness that is substantially transparent to infrared electromagnetic radiation. Applicants have found that the aforementioned thickness of 800 to 1000 Angstroms achieves this result. For such a deposition thickness of the titanium layer 14 in the solar energy collector 8, infrared electromagnetic radiation is emitted from the surface of the deposited aluminum layer 12 adjacent the titanium layer 14 and is substantially transmitted therethrough leaving the solar energy collector 8 from the surface 14a. The deposited aluminum layer 12 is a comparatively poor infrared electromagnetic radiation emitter and thus the radiative heat losses from the solar energy collector 8 are minimized. It has been found that the infrared emissivity of the solar energy collector 8 has a value of .03 or less compared with the radiation emittance of a 70° F. black body. Due to the limitations of testing techniques, infrared radiation emissivities having values of .03 or less are extremely difficult to measure accurately and the true infrared electromagnetic radiation emissivity, as described above, may be even lower than the .03 value.

From the above it can be seen that the ratio of solar energy absorptivity to infrared radiation emissivity for the solar energy collector material is, at a minimum, 27; though actual values may be considerably higher.

Figure 2:
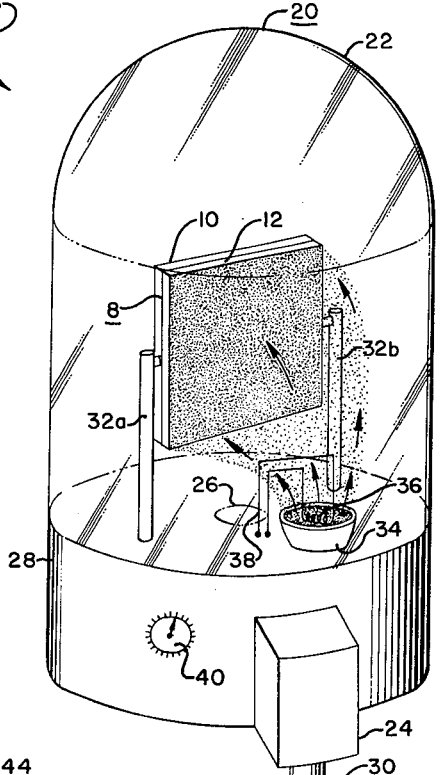
FIGURE 2 is a pictorial representation of the vacuum deposition of titanium.

FIGURE 2 illustrates pictorially one method of preparing the solar energy collector 8 described in connection with FIGURE 1. A vacuum chamber, generally designated 20, is comprised of a transparent dome material 22, a base 28, and a vacuum pump 24. Air is drawn out from the inside of the dome 22 by the vacuum pump 24 through aperture 26 in the base 28 of the vacuum chamber and the air is exhausted through tube 30. A substrate 10, upon which there is a vacuum deposited layer of aluminum 12, is held in the vacuum chamber by supports 32a and 32b. A titanium boat 34 in the vacuum chamber 20 contains a source of raw titanium 36. The titanium boat 34 is maintained at a distance of approximately 18 inches from the aluminum layer 12. The vacuum pump 24 is actuated and the pressure inside the dome 22 is reduced to a value of approximately $10^{-4}$ millimeters of mercury absolute. The electric current flowing through a heater coil 38 is adjusted by heater control 40 to heat the raw titanium 36 to a value sufficient to cause evaporation at the pressure of $10^{-4}$ millimeters of mercury absolute. When this temperature is reached, the raw titanium 36 is evaporated and leaves the boat 34 and is deposited upon the aluminum layer 12.

Since the vacuum is maintained at a comparatively poor value of $10^{-4}$ millimeters of mercury absolute, the evaporated titanium impinges upon and reacts with many of the residual constituent molecules remaining inside the dome 22. The exact nature and type of these reactions are not known by applicants; however, theory indicates that in addition to raw titanium being deposited on the aluminum layer 12 there are also titanium oxides, titanium nitrides, and other titanium compounds. To provide sufficient time for these reactions to take place, applicants limit the evaporation rate of the raw titanium 36 to provide a deposition rate on the aluminum layer 12 of approximately 80 Angstroms per second.

Figure 3:
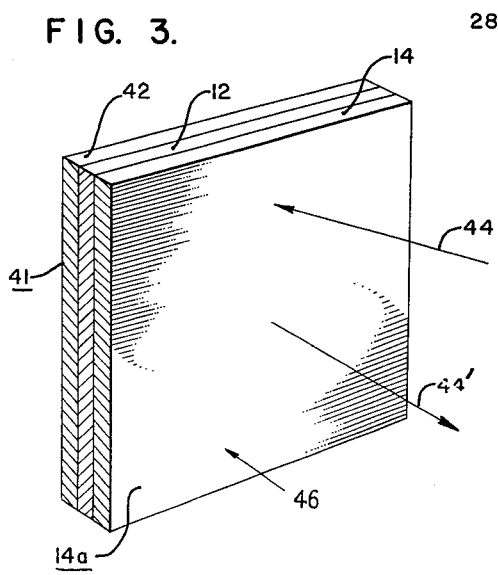
FIGURE 3 is an infrared mirror according to applicants' invention.

Applicants' invention also may be utilized as an infrared mirror in the optics portion of infrared detector systems. Since, as described above, the infrared emissivity is very low, there is very little spurious signal generated by the mirror. Further, the visible electromagnetic radiation energy reflectance of a solar energy collector according to applicants' invention has also been found to be low while the infrared electromagnetic radiation energy reflectance has been found to be quite high. FIGURE 3 illustrates an infrared mirror, generally designated 41, in accordance with these principles. A suitable substrate 42, which may be aluminum or another material, is lapped and polished on one side to provide a smooth surface. A layer of aluminum 12 is then vacuum deposited upon the lapped and polished surface of the substrate 52. A layer of titanium 14 is vacuum deposited upon the aluminum layer 12 by the method described in connection with FIGURE 2 to provide the infrared mirror 41.

Another suitable substrate for an infrared mirror according to applicants' invention may be prepared by bonding a layer of epoxy resin approximately .001 inch thick to an aluminum sheet. The layer of vacuum deposited aluminum is placed upon the epoxy resin followed by the titanium deposition as described above.

When incident infrared electromagnetic radiation energy, illustrated in FIGURE 3 by arrow 44, impinges on the surface 14a of the titanium layer 14, it is substantially reflected therefrom as illustrated by arrow 44'. However, if visible electromagnetic radiation, designated by arrow 46, is incident on the surface 14a, it is substantially absorbed by the surface 14a. Further, due to the low infrared electromagnetic radiation energy emissivity of the surface 14a there is generally very little spurious radiation emitted therefrom and the reflected infrared electromagnetic radiation 44' from the surface 14a is substantially accurately representative of the incident infrared electromagnetic radiation 44.

Those skilled in the art will find many variations and adaptations of applicants' invention. Therefore, the foregoing description of the various embodiments of applicants' invention together with the accompanying drawing are intended to be illustrative and not limiting and the appended claims are intended to cover all variations and adaptations within the true scope and spirit of this invention.

What is claimed as new and is desired to be secured by Letters Patent of the United States is:

1. In combination: a thin-film substrate; a layer of vacuum deposited aluminum bonded to one side of said thin-film substrate and having a thickness between 200 and 400 Angstroms; and a layer of vacuum deposited titanium having a thickness between 800 and 1000 Angstroms bonded to said layer of aluminum.

2. A method of making a solar energy absorbing surface comprising the steps of: vacuum depositing a layer of aluminum to a thickness of approximately 200 to 400 Angstroms upon a suitable substrate; and vacuum depositing a layer of titanium on said layer of aluminum to a thickness between 800 and 1000 Angstroms at a deposition rate of approximately 80 Angstroms per second and under an air vacuum of approximately $10^{-4}$ millimeters of mercury absolute.

3. The method according to claim 2, wherein a titanium boat supplying the raw titanium for vacuum deposition is maintained approximately 18 inches from said substrate during said vacuum deposition of said layer of titanium.

4. A method of making a solar energy absorbing surface comprising the steps of: vacuum depositing a layer of aluminum to a thickness of approximately 200 to 400 Angstroms upon a suitable substrate; and vacuum depositing a layer of titanium on said layer of aluminum to a thickness between 800 and 1000 Angstroms under an air vacuum of approximately 10⁻⁴ millimeters of mercury absolute.

5. The method of making an infrared mirror comprising the steps of: lapping and polishing a substrate; vacuum depositing a layer of aluminum on said substrate; and vacuum depositing a layer of titanium on said layer of aluminum to a thickness of approximately 1000 Angstroms at a deposition rate of approximately 80 Angstroms per second under an air vacuum of approximately 10⁻⁴ millimeters of mercury absolute.

6. The method according to claim 5, wherein a titanium boat supplying the titanium for vacuum deposition is maintained approximately 18 inches from said substrate during said vacuum deposition of said layer of titanium.

7. A method of making a solar energy absorbing surface comprising the steps of: vacuum depositing a layer of aluminum to a thickness of approximately 200 to 400 Angstroms upon a suitable substrate; and vacuum depositing a layer of titanium on said layer of aluminum to a thickness substantially transparent to infrared electromagnetic radiation energy under an air vacuum of approximately 10⁻⁴ millimeters of mercury absolute.

8. The method of making an infrared mirror comprising the steps of: lapping and polishing a substrate; vacuum depositing a layer of aluminum on said substrate; and vacuum depositing a layer of titanium to said layer of aluminum to a thickness substantially transparent to infrared electromagnetic radiation energy at a deposition rate of approximately 80 Angstroms per second under an air vacuum of approximately 10⁻⁴ millimeters of mercury absolute.

9. The method of making an infrared mirror comprising the steps of: vacuum depositing an opaque layer of aluminum on a suitable substrate; and vacuum depositing a substantially infrared electromagnetic radiation energy transparent layer of titanium to said layer of aluminum at a deposition rate of approximately 80 Angstroms per second under an air vacuum of approximately 10⁻⁴ millimeters of mercury absolute.

10. A solar energy collector and infrared energy reflector comprising:
(A) a substrate;
(B) an adherent opaque layer of aluminum on one surface of said substrate and having a thickness between 200 and 400 Angstroms; and
(C) an adherent layer of titanium on said layer of aluminum and having a thickness between 800 and 1000 Angstroms which is substantially opaque to solar energy and substantially transparent to infrared energy.

References Cited by the Examiner
UNITED STATES PATENTS

| | | | |
|---|---|---|---|
| 2,585,128 | 2/52 | Howe et al. | 117—35 |
| 2,784,115 | 3/57 | Brinsmaid et al. | 117—35 |
| 2,917,817 | 12/59 | Tabor. | |

OTHER REFERENCES

Hass et al.: J. Optical Society of America, vol. 47 No. 2, February 1957, pp. 125–129.

Evaporated Metal Films Corp., publication, Mar. 5, 1959, published by: Evaporated Metal Films Corp., Ithaca, New York.

RICHARD D. NEVIUS, *Primary Examiner.*

REUBEN EPSTEIN, CARL D. QUARFORTH,
*Examiners.*